B. LA F. HENDRICKS.
LOCKING DEVICE.
APPLICATION FILED MAY 22, 1919.

1,338,131. Patented Apr. 27, 1920.

Inventor:
B. L. Hendricks

UNITED STATES PATENT OFFICE.

BENJAMIN LA FAYETTE HENDRICKS, OF MACON, GEORGIA.

LOCKING DEVICE.

1,338,131.  Specification of Letters Patent.  Patented Apr. 27, 1920.

Application filed May 22, 1919. Serial No. 299,054.

*To all whom it may concern:*

Be it known that I, BENJAMIN LA FAYETTE HENDRICKS, a citizen of the United States, residing at Macon, in the county of Bibb and State of Georgia, have invented certain new and useful Improvements in Locking Devices, of which the following is a specification, reference being had to the accompanying drawings.

This invention relates to certain improvements in locking devices, and primarily it is an object of the invention to provide a novel and improved device of this general character particularly adapted to prevent unauthorized use of an automobile or the like.

It is also an object of the invention to provide a novel and improved locking device of this general character adapted for coaction with the shifting lever or the like of an automobile and which operates to maintain said lever in a neutral or inoperative position so that the driving of a car by an unauthorized person is substantially prevented.

The invention consists in the details of construction and in the combination and arrangement of the several parts of my improved locking device whereby certain important advantages are attained and the device rendered simpler, less expensive, and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 4:
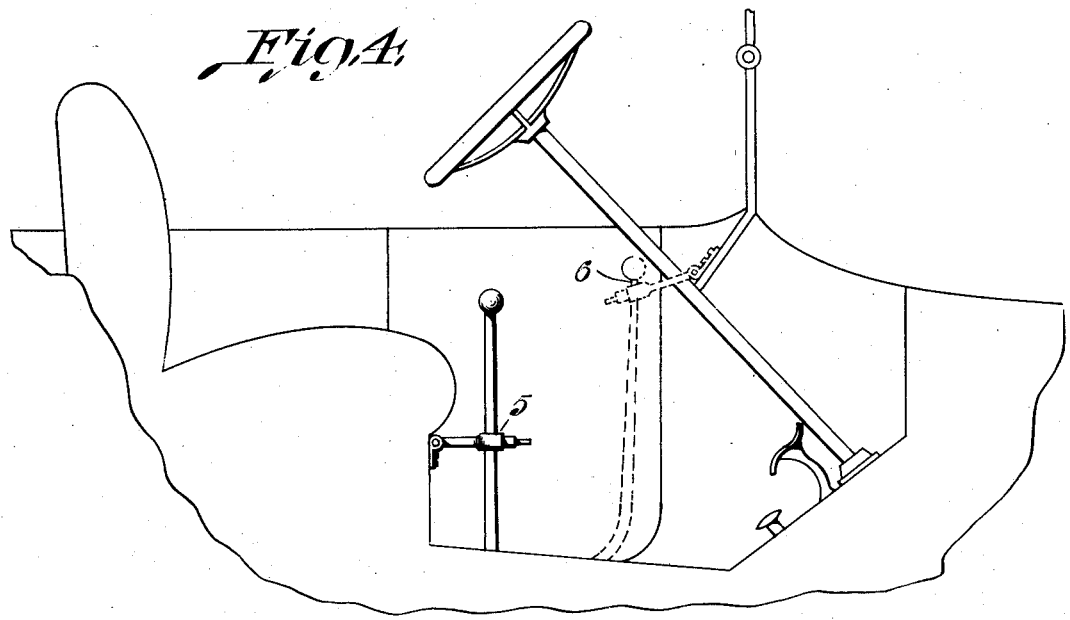
Fig. 4 is a fragmentary view of an automobile showing a locking device constructed in accordance with an embodiment of my invention in working position, the second location of the device being indicated by dotted lines.
Figure 1:
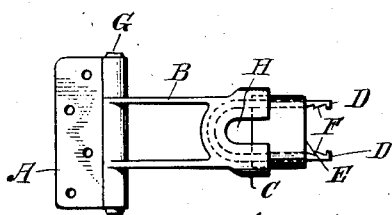
Figure 1 is a view in top plan of a locking device constructed in accordance with an embodiment of my invention.
Figure 3:
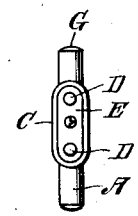
Fig. 3 is a view in end elevation of my improved locking device as herein embodied.
Figure 2:
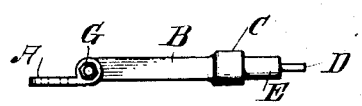
Fig. 2 is a view in side elevation of the device as illustrated in Fig. 1.

As disclosed in the accompanying drawings, A denotes a butt or plate adapted to be suitably anchored to the seat structure or to the dash or other forward part of the automobile body. The butt or plate A is provided along one marginal portion with suitable knuckles between which interfit extended portions of a hasp B, and coacting with said knuckles and interfitting portions is a pintle G whereby the hasp B may have swinging movement with respect to the butt or plate A. When my improved device is assembled, the hasp B has swinging movement in a vertical direction.

The outer end portion of the hasp B is provided with an open slot H adapted to receive a gear shift lever or the like, and particularly when said lever is in neutral position. The outer end portion of the hasp B at opposite sides of the slot H is provided with a pocket or recess C for a purpose to be hereinafter more particularly referred to.

Extending outwardly and longitudinally from the outer or free end of the hasp B and at opposite sides of the slot H are the pins D provided in their opposed faces with notches F. E denotes a lock adapted to be applied to the pins D and through which said pins D extend. The lock E includes a mechanism (not shown) whereby the same may be suitably engaged with the notches F to hold the lock E in working position.

After the gear shift lever has been properly received within the slot H, the lock E is applied to the pins D and forced into substantially close contact with the lever, whereby the lever is effectively held within the slot H and against movement by an unauthorized person. When the lock E is in working position, an end portion thereof fits or extends within a pocket or recess C and thereby preventing any possibility of twisting the lock E on the pins D to effect a release of the lever.

From the foregoing description, it is thought to be obvious that a locking device constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:—

1. A locking device for a swinging lever comprising a plate adapted to be supported independently of the lever, a hasp pivotally engaged with the plate and provided in its free end portion with an open slot to receive the lever when in one position, outstanding pins carried by the hasp at opposite sides of the slot, and a lock engageable with said pins and adapted to substantially contact with the lever when within the slot, the outer end of the hasp being provided with a recess in which seats a portion of the lock when in applied position.

2. A locking device for a swinging lever comprising a plate adapted to be supported independently of the lever, a hasp pivotally engaged with the plate and provided in its free end portion with an open slot to receive the lever when in one position, outstanding pins carried by the hasp at opposite sides of the slot, and a lock slidably engageable with said pins and adapted to substantially contact with the lever when within the slot, the outer end of the hasp being provided with a recess in which seats a portion of the lock when in applied position.

BENJAMIN LA FAYETTE HENDRICKS.